US011432035B2

(12) United States Patent
Sen et al.

(10) Patent No.: US 11,432,035 B2
(45) Date of Patent: Aug. 30, 2022

(54) ADAPTIVE STREAMING WITH DEMUXED AUDIO AND VIDEO TRACKS

(71) Applicants: AT&T Intellectual Property I, L.P., Atlanta, GA (US); THE UNIVERSITY OF CONNECTICUT, Farmington, CT (US)

(72) Inventors: Subhabrata Sen, Westfield, NJ (US); Yanyuan Qin, Storrs Mansfield, CT (US); Bing Wang, Storrs Mansfield, CT (US)

(73) Assignees: AT&T Intellectual Property I, L.P., Atlanta, GA (US); THE UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 16/929,807

(22) Filed: Jul. 15, 2020

(65) Prior Publication Data

US 2022/0021929 A1 Jan. 20, 2022

(51) Int. Cl.
*H04N 21/434* (2011.01)
*H04L 65/60* (2022.01)
*H04L 65/65* (2022.01)
*H04L 65/80* (2022.01)
*H04N 21/61* (2011.01)
(Continued)

(52) U.S. Cl.
CPC ....... *H04N 21/4341* (2013.01); *H04L 65/601* (2013.01); *H04L 65/608* (2013.01); *H04L 65/80* (2013.01); *H04N 21/2662* (2013.01); *H04N 21/4392* (2013.01); *H04N 21/44004* (2013.01); *H04N 21/6125* (2013.01); *H04N 21/643* (2013.01)

(58) Field of Classification Search
CPC .......... H04N 21/4341; H04N 21/2662; H04N 21/4392; H04N 21/44004; H04N 21/6125; H04N 21/643; H04L 65/601; H04L 65/608; H04L 65/80
See application file for complete search history.

(56) References Cited

U.S. PATENT DOCUMENTS

| 7,571,246 B2 * | 8/2009 | Virdi | H04N 21/2402 725/117 |
| 2006/0026294 A1 * | 2/2006 | Virdi | H04N 21/658 709/232 |

(Continued)

FOREIGN PATENT DOCUMENTS

| WO | WO-2008119954 A2 * | 10/2008 | .......... H04L 65/602 |
| WO | WO-2019088853 A1 * | 5/2019 | .......... H04N 9/8211 |

*Primary Examiner* — James R Sheleheda
(74) *Attorney, Agent, or Firm* — Guntin & Gust, PLC; Douglas Schnabel

(57) ABSTRACT

Aspects of the subject disclosure may include, for example, accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing. Other embodiments are disclosed.

20 Claims, 7 Drawing Sheets

(51) Int. Cl.
*H04N 21/2662* (2011.01)
*H04N 21/439* (2011.01)
*H04N 21/44* (2011.01)
*H04N 21/643* (2011.01)

(56) References Cited

U.S. PATENT DOCUMENTS

| | | | |
|---|---|---|---|
| 2006/0282774 A1* | 12/2006 | Covell | H04N 21/2343 |
| | | | 715/716 |
| 2012/0023253 A1* | 1/2012 | Rhyu | H04N 21/8456 |
| | | | 709/231 |
| 2015/0095450 A1* | 4/2015 | Vitthaladevuni | H04L 65/1083 |
| | | | 709/217 |
| 2019/0020908 A1* | 1/2019 | Makovetzky | H04N 21/2385 |
| 2019/0364330 A1* | 11/2019 | Moroney | H04N 21/26613 |

* cited by examiner

ADAPTIVE STREAMING WITH DEMUXED AUDIO AND VIDEO TRACKS

FIELD OF THE DISCLOSURE

The subject disclosure relates to adaptive multimedia content streaming.

BACKGROUND

Adaptive streaming is a predominant approach for video streaming over the Internet. It adapts to dynamic network conditions by switching its streaming between multiple tracks/variants encoded at different bitrates and quality levels. When the audio and video tracks are stored separately (i.e., in demuxed mode), the adaptive streaming client needs to dynamically determine which audio and which video track to select for each chunk/playback position.

BRIEF DESCRIPTION OF THE DRAWINGS

Reference will now be made to the accompanying drawings, which are not necessarily drawn to scale, and wherein.

DETAILED DESCRIPTION

Figure 1:
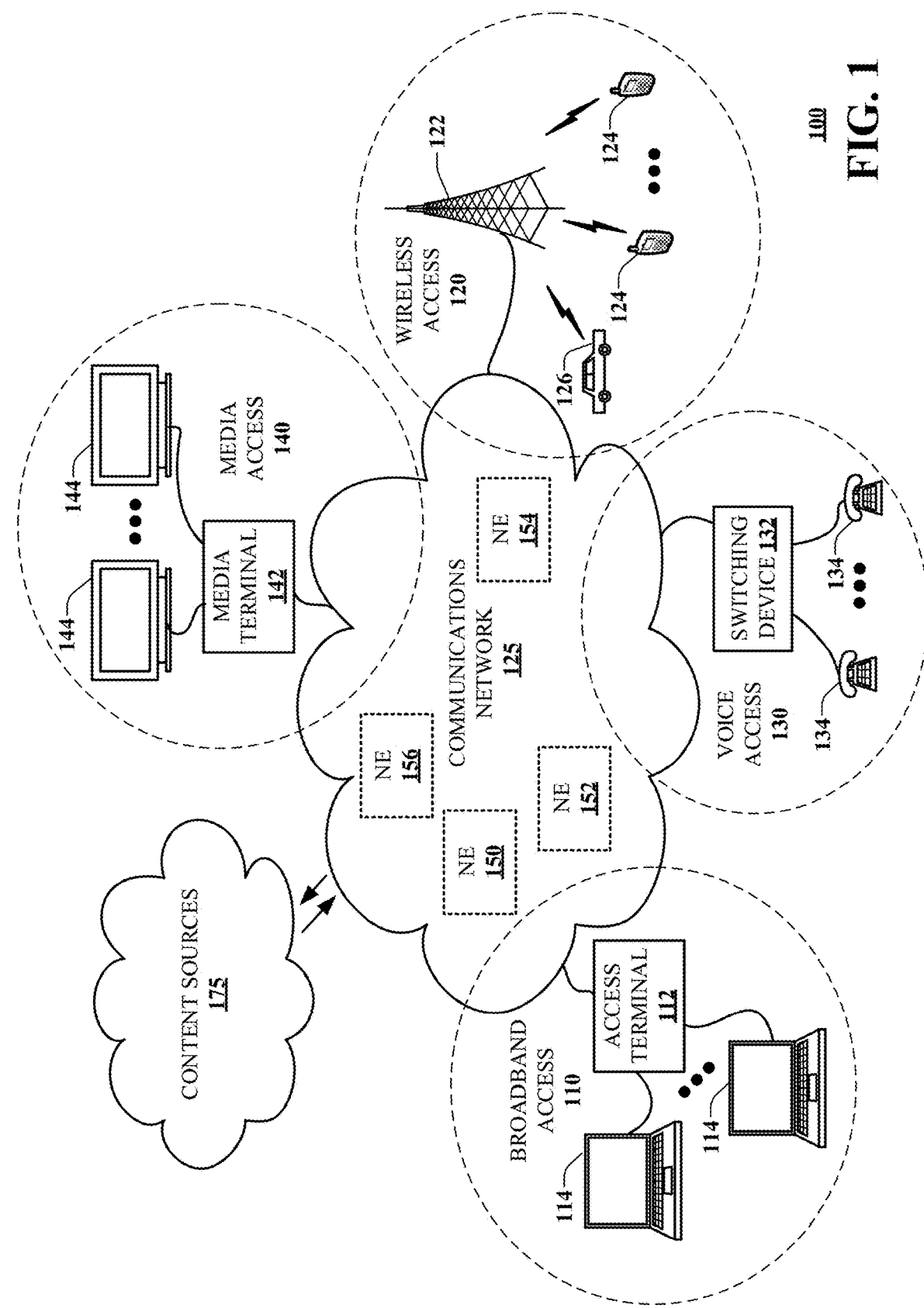
FIG. 1 is a block diagram illustrating an exemplary, non-limiting embodiment of a communications network in accordance with various aspects described herein.

The subject disclosure describes, among other things, illustrative embodiments for adaptive streaming of multimedia content via demultiplexed video and audio tracks. According to techniques described herein, an adaptive streaming client may use information comprised in a manifest file to make intelligent decisions regarding the video and audio tracks it selects in conjunction with streaming multimedia content segments. In some embodiments, the manifest file may contain information indicating a set of allowable video track/audio track combinations that are candidates for selection by the adaptive streaming client. In some embodiments, the manifest file may contain bandwidth requirement information indicating bandwidth requirements for such candidate combinations, as well as individual bandwidth requirements for the various video tracks and audio tracks. In some embodiments, the adaptive streaming client may perform available bandwidth measurements and select from among the candidate combinations based on those measurements, with reference to the requirements indicated in the manifest file. Other embodiments are described in the subject disclosure.

One or more aspects of the subject disclosure include an apparatus comprising a processing system including a processor and a memory that stores executable instructions that, when executed by the processing system, facilitate performance of operations. The operations can include accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

One or more aspects of the subject disclosure include a non-transitory machine-readable medium, comprising executable instructions that, when executed by a processing system including a processor, facilitate performance of operations. The operations can include accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

One or more aspects of the subject disclosure include a method. The method can include accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

Referring now to FIG. 1, a block diagram is shown illustrating an example, non-limiting embodiment of a communications network 100 in accordance with various aspects described herein. For example, communications network 100 can facilitate in whole or in part accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
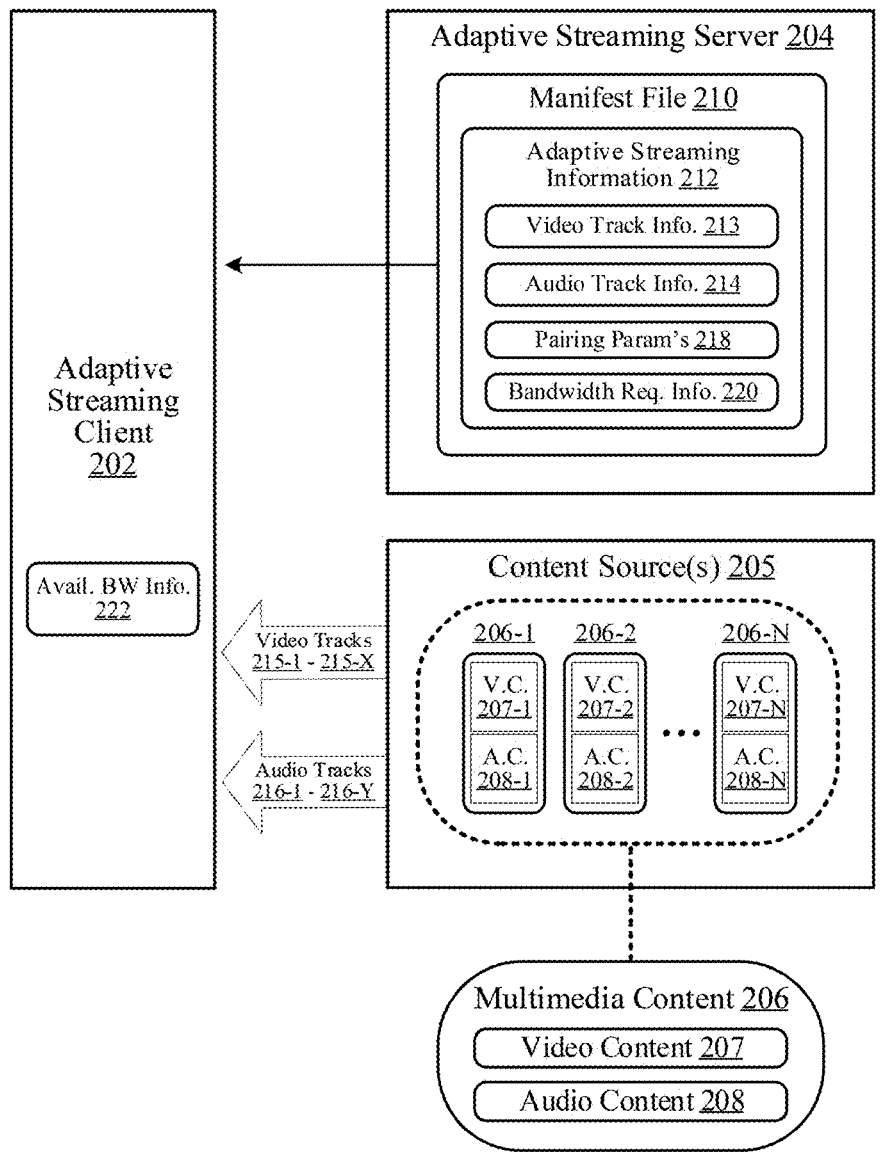
FIG. 2 is a block diagram illustrating an example, non-limiting embodiment of an operating environment in accordance with various aspects described herein.

FIG. 2 is a block diagram illustrating an example, non-limiting embodiment of an operating environment 200 in accordance with various aspects described herein. In operating environment 202, an adaptive streaming client 202 communicates with an adaptive streaming server 204 in conjunction with adaptive streaming, such as adaptive bitrate (ABR) streaming, of multimedia content 206. Adaptive streaming client 202 may be representative of, for example, an application executing on a user device such as a data terminal 114, mobile device 124, or media terminal 142 in communications network 100 of FIG. 1.

As reflected in FIG. 2, multimedia content 206 can comprise video content 207 and audio content 208, corresponding to video and audio aspects of multimedia content 206, respectively. To facilitate adaptive streaming, multimedia content 206 can be partitioned into N multimedia content segments 206-1 to 206-N. Each of multimedia content segments 206-1 to 206-N may comprise respective portions of video and audio content 207-1 to 207-N and 208-1 to 208-N.

As shown in FIG. 2, the video and audio content of the various multimedia content segments 206-1 to 206-N of multimedia content 206 can be accessible to adaptive streaming client 202 via one or more content sources 205. More particularly, via content source(s) 205, adaptive streaming client 202 may have access to various versions of the video content 207-1 to 207-N and audio content 208-1 to 208-N associated with the multimedia content segments 206-1 to 206-N of multimedia content 206. For example, via content source(s) 205, adaptive streaming client 202 may have access to a low-resolution version of video content 207-1, a medium-resolution version of video content 207-1, and a high-resolution version of video content 207-1. In another example, via content source(s) 205, adaptive streaming client 202 may have access to version of audio content 208-1 that is encoded at a low bit rate, a version encoded at a medium bit rate, and a version encoded at a high bit rate. The embodiments are not limited to these examples.

Operating environment 200 may be representative of the implementation of a demultiplexed (demuxed) adaptive streaming scheme, such as demuxed ABR streaming. According to a demuxed adaptive streaming scheme, the respective video and audio content of a given multimedia content segment are provided to the client separately, rather than in a combined form. One set of tracks conveys various versions of the video content of the multimedia content segment, while another set of tracks conveys various versions of the audio content of the multimedia content segment. In operating environment 200, for each of X available versions of the video content of a given multimedia content segment, obtaining that version may involve accessing a corresponding one of X video tracks 215-1 to 215-X. Likewise, for each of Y available versions of the audio content of a given multimedia content segment, obtaining that version may involve accessing a corresponding one of Y audio tracks 216-1 to 216-Y.

In order to obtain information regarding the various versions that are available of the video content and audio content associated with a given multimedia content segment, adaptive streaming client 202 may access a manifest file 210 provided by adaptive streaming server 204. According to some embodiments, manifest file 210 may represent a manifest file formatted in accordance with an adaptive streaming standard/protocol such as Dynamic Adaptive Streaming over Hypertext Transfer Protocol (DASH) or Hypertext Transfer Protocol Live Streaming (HLS). Manifest file 210 may comprise adaptive streaming information 212, which may generally represent information that facilitates adaptive streaming of one or more of the multimedia content segments 206-1 to 206-N of multimedia content 206. For each such multimedia content segment, adaptive streaming information 212 can include video track information 213 and audio track information 214.

For a given multimedia content segment, video track information 213 can comprise information identifying a plurality of video tracks conveying video content of that multimedia content segment, information describing respective versions of the video content available via those various video tracks, and information indicating the respective locations from which those video tracks can be obtained. Likewise, for a given multimedia content segment, audio track information 214 can comprise information identifying a plurality of audio tracks conveying audio content of that multimedia content segment, information describing respective versions of the audio content available via those various audio tracks, and information indicating the respective locations from which those audio tracks can be obtained.

In operating environment 200, adaptive streaming by adaptive streaming client 202 of any given multimedia content segment of multimedia content 206 may involve selecting a track pairing to be used to stream that multimedia content segment. The track pairing may designate a video track to be used to obtain video content of the multimedia content segment and an audio track to be used to obtain audio content of the multimedia content segment. Assuming that there are X versions of the video content and Y versions of the audio content, the track pairing may comprise one of X*Y possible video track/audio track combinations. After obtaining the video and audio content of the multimedia content segment via the designated video and audio tracks, adaptive streaming client 202 may synchronize and/or combine the obtained video and audio content to enable playback of the multimedia content segment.

In some embodiments, adaptive streaming server 204 may be configured with the ability to stipulate a set of allowable track pairings, comprising a subset of the X*Y possible track pairings for the multimedia content segment. In some embodiments, the allowable track pairings may be selected based on the nature of the video and audio content comprised in the multimedia content segment and the multimedia content 206 of which it comprises a portion. For example, track pairings featuring high resolution video tracks may be favored for inclusion among the allowable track pairings for an action movie, while track pairings featuring high bit rate audio tracks may be favored for inclusion among the allowable track pairings for a music video. The embodiments are not limited to this example.

In some embodiments, adaptive streaming server 204 may notify clients such as adaptive streaming client 202 of the allowable video/audio track pairings by including pairing parameters 218 in adaptive streaming information 212. In such embodiments, adaptive streaming client 202 may access adaptive streaming information 212, identify the allowable track pairings indicated by pairing parameters 218 as candidate track pairings for potential use in streaming the multimedia content segment, select one of the candidate track pairings, and use it to obtain the video and audio content of the multimedia content segment. In some other embodiments, adaptive streaming server 204 may disseminate information regarding the allowable track pairings using an out-of-band mechanism, such as via an auxiliary file that adaptive streaming client 202 downloads over HTTP (e.g., using HTTP PUSH).

In some embodiments, to simplify the rate adaptation task at adaptive streaming client 202, adaptive streaming client 202 may be configured to use only track pairings that are included among the allowable track pairings specified by adaptive streaming server 204. In some embodiments, adaptive streaming client 202 may be configured to conduct joint audio/video ABR adaptation and track selection, rather than making audio and video rate adaptation decisions separately. In some embodiments, adaptive streaming client 202 may be configured to perform such joint adaptation and track selection according to rules/algorithms that balance the objectives of maximizing quality, minimizing stalls and variations in quality, and avoiding excessively frequent audio/video track changes. In some embodiments, adaptive streaming client 202 may be configured to sync the duration of prefetched audio and video content at a fine level of granularity (e.g., at the segment/chunk level or in terms of a small number of segments/chunks). In some embodiments, this syncing may help avoid scenarios in which the video buffer contains data but the audio buffer is empty, or vice versa, such that playback cannot be initiated.

In some embodiments, adaptive streaming server 204 may be configured to provide adaptive streaming clients such as adaptive streaming client 202 with information regarding the bandwidth requirements of the various individual audio and video tracks (e.g., video tracks 215-1 to 215-X and audio tracks 216-1 to 216-Y) via which media content segments are streamed. Information regarding the bandwidth requirements of the various individual audio and video tracks may be particularly useful to adaptive streaming clients such as adaptive streaming client 202 in cases in which audio and video are fetched over different network paths that have different network characteristics (e.g., when they are stored at different servers). In some embodiments, adaptive streaming server 204 may provide this information by including bandwidth requirement information 220 in adaptive streaming information 212. In some embodiments, bandwidth requirement information 220 may include information regarding the aggregate bandwidth requirements associated with the various allowable video/audio track pairings. In some embodiments, rather than providing per-track bandwidth information in the form of bandwidth requirement information 220 comprised in adaptive streaming information 212, adaptive streaming server 204 may disseminate such information using an out-of-band mechanism, such as via an auxiliary file that adaptive streaming client 202 downloads over HTTP (e.g., using HTTP PUSH). The embodiments are not limited in this context.

In some embodiments, adaptive streaming client 202 may be configured to perform ongoing audio adaptation in order to avoid adverse impacts upon quality of experience (e.g., rebuffering or low audio quality) that can arise in dynamic network bandwidth scenarios. In such embodiments, adaptive streaming client 202 may favor low quality/bitrate audio tracks when available bandwidth is low, and may favor higher quality/bitrate audio tracks when conditions permit.

Figure 3:
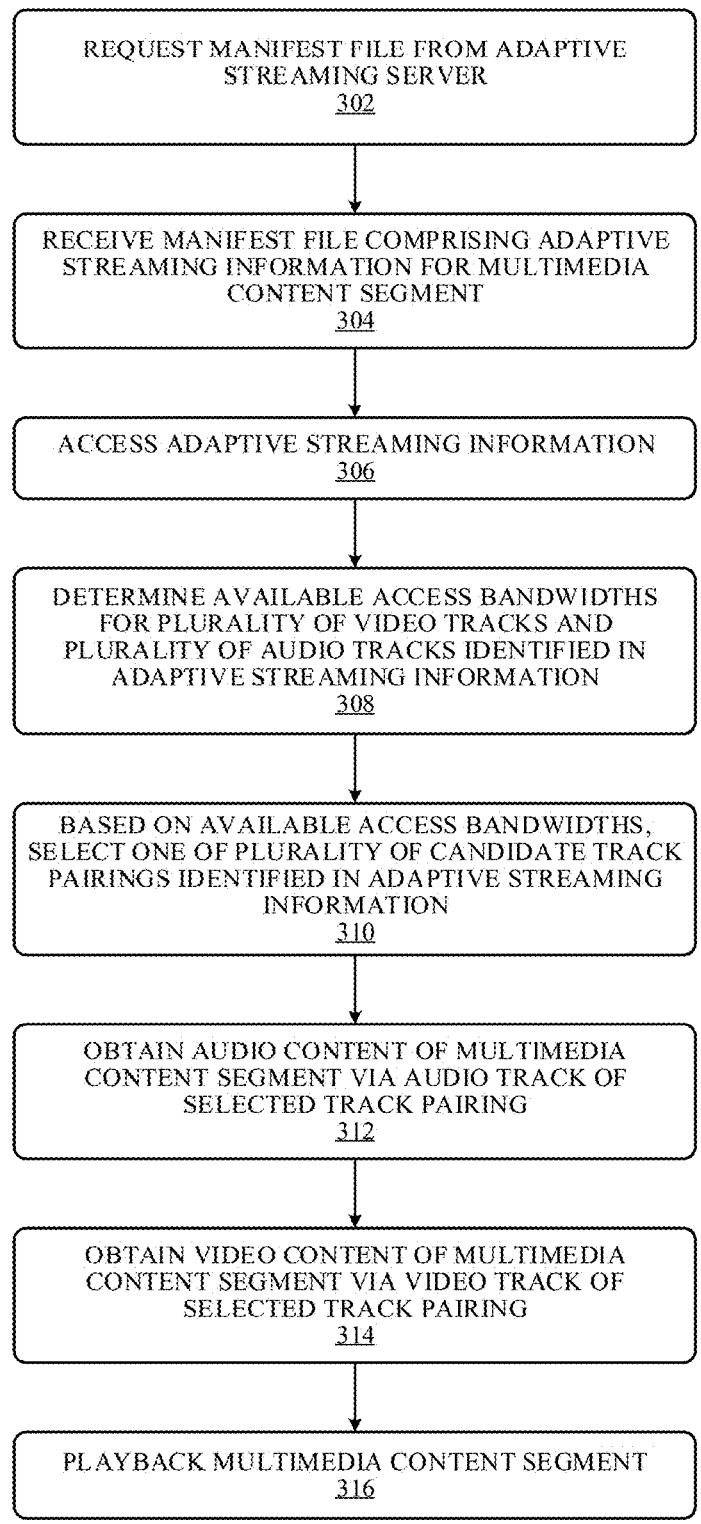
FIG. 3 depicts an illustrative embodiment of a method in accordance with various aspects described herein.

FIG. 3 depicts an illustrative embodiment of a method 300 in accordance with various aspects described herein. According to some embodiments, method 300 may be representative of operations that may be performed by adaptive streaming client 202 of FIG. 2 in conjunction with adaptive streaming of multimedia content 206. As shown in FIG. 3, a manifest file may be requested from an adaptive streaming server at 302. For example, in operating environment 200 of FIG. 2, adaptive streaming client 202 may request manifest file 210 from adaptive streaming server 204. At 304, a manifest file may be received that comprises adaptive streaming information for a multimedia content segment. For example, in operating environment 200 of FIG. 2, adaptive streaming client 202 may receive manifest file 210, which may comprise adaptive streaming information 212 for a multimedia content segment among multimedia content segments 206-1 to 206-N.

At 306, the adaptive streaming information may be accessed. For example, in operating environment 200 of FIG. 2, adaptive streaming client 202 may access adaptive streaming information 212. At 308, available access bandwidths may be determined for a plurality of video tracks and a plurality of audio tracks identified in the adaptive streaming information. For example, in operating environment 200 of FIG. 2, adaptive streaming client 202 may determine available access bandwidths for video tracks 215-1 to 215-X and audio tracks 216-1 to 216-Y. At 310, one of a plurality of candidate track pairings identified in the adaptive streaming information may be selected based on the available access bandwidths determined at 308. For example, in operating environment 200 of FIG. 2, adaptive streaming client 202 may select one of a plurality of candidate track pairings indicated by pairing parameters 218 based on available bandwidth information 222.

At 312, audio content of the multimedia content segment may be obtained via the audio track of the track pairing selected at 310. For example, in operating environment 200 of FIG. 2, adaptive streaming client 202 may obtain audio content of one of multimedia content segments 206-1 to 206-N via one of audio tracks 216-1 to 216-Y that is associated with the selected track pairing. At 314, video content of the multimedia content segment may be obtained via the video track of the track pairing selected at 310. For example, in operating environment 200 of FIG. 2, adaptive streaming client 202 may obtain video content of one of multimedia content segments 206-1 to 206-N via one of video tracks 215-1 to 216-X that is associated with the selected track pairing. At 316, the multimedia content segment may be played back. For example, in operating environment 200 of FIG. 2, adaptive streaming client 202 may play back one of multimedia content segments 206-1 to 206-N. The embodiments are not limited to these examples.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
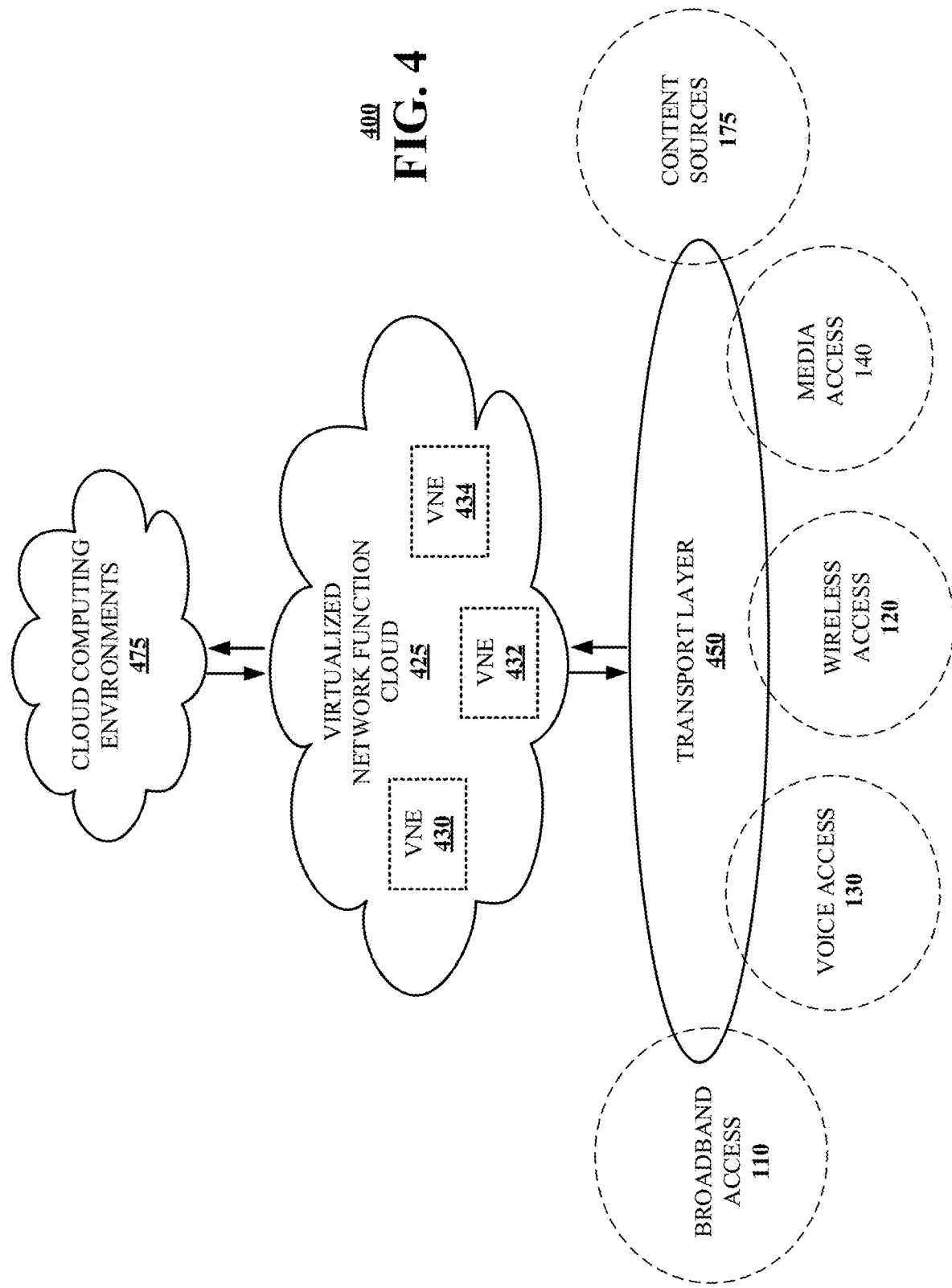
FIG. 4 is a block diagram illustrating an example, non-limiting embodiment of a virtualized communication network in accordance with various aspects described herein.

Referring now to FIG. 4, a block diagram 400 is shown illustrating an example, non-limiting embodiment of a virtualized communication network in accordance with various aspects described herein. In particular a virtualized communication network is presented that can be used to implement some or all of the subsystems and functions of communication network 100 in FIG. 1, the subsystems and functions of adaptive streaming client 202, adaptive streaming server 204 and/or content source(s) 205 in FIG. 2, and/or method 300 of FIG. 3. For example, virtualized communication network 300 can facilitate in whole or in part accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 430, 432, 434, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 430 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 450 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 430, 432 or 434. These network elements can be included in transport layer 450.

The virtualized network function cloud 425 interfaces with the transport layer 450 to provide the VNEs 430, 432, 434, etc. to provide specific NFVs. In particular, the virtualized network function cloud 425 leverages cloud operations, applications, and architectures to support networking workloads. The virtualized network elements 430, 432 and 434 can employ network function software that provides either a one-for-one mapping of traditional network element function or alternately some combination of network functions designed for cloud computing. For example, VNEs 430, 432 and 434 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 430, 432, 434, etc. can be instantiated and managed using an orchestration approach similar to those used in cloud compute services.

The cloud computing environments 475 can interface with the virtualized network function cloud 425 via APIs that expose functional capabilities of the VNEs 430, 432, 434, etc. to provide the flexible and expanded capabilities to the virtualized network function cloud 425. In particular, network workloads may have applications distributed across the virtualized network function cloud 425 and cloud computing environment 475 and in the commercial cloud, or might simply orchestrate workloads supported entirely in NFV infrastructure from these third party locations.

Figure 5:
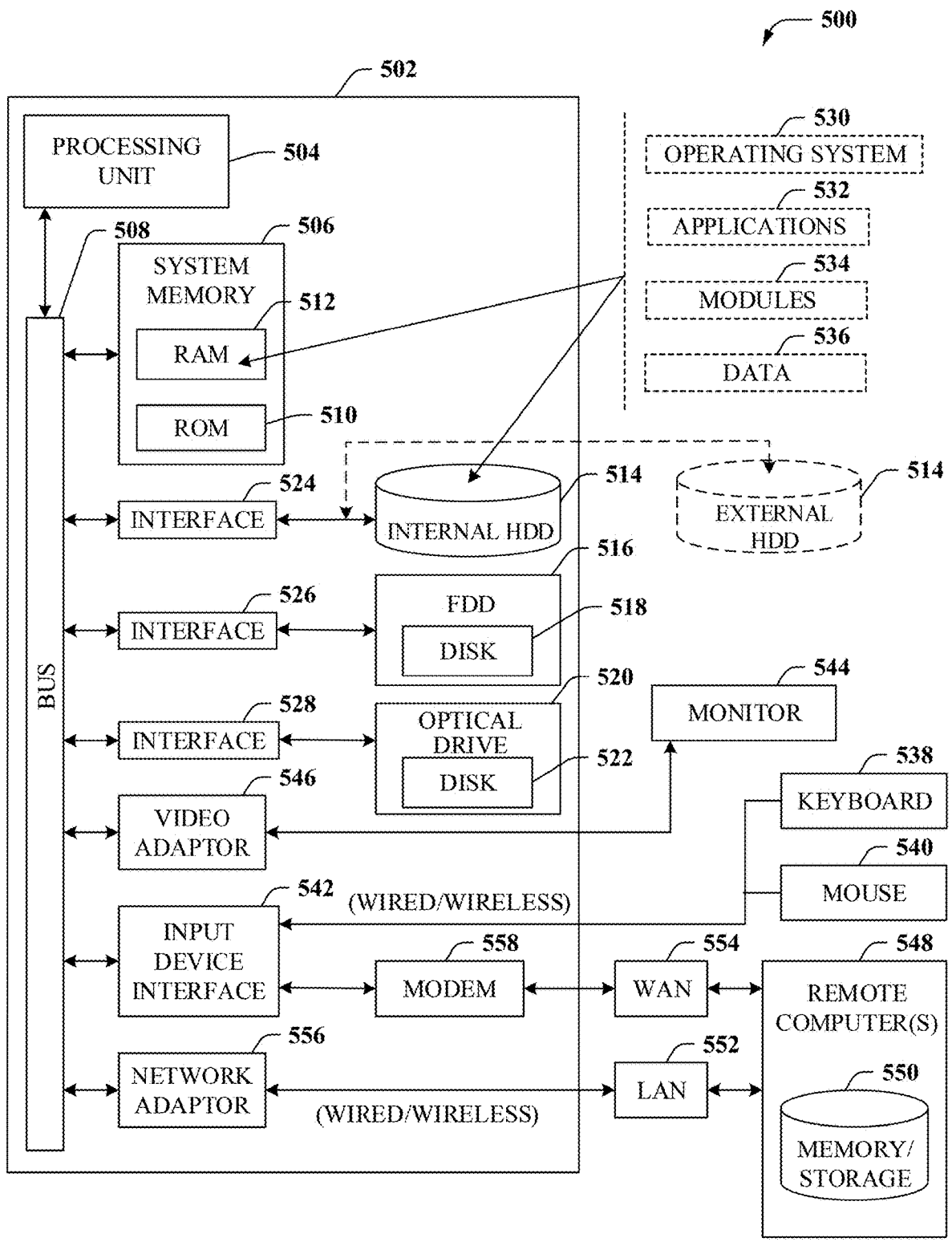
FIG. 5 is a block diagram of an example, non-limiting embodiment of a computing environment in accordance with various aspects described herein.

Turning now to FIG. 5, there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. In particular, computing environment 500 can be used in the implementation of network elements 150, 152, 154, 156, access terminal 112, base station or access point 122, switching device 132, media terminal 142, and/or VNEs 430, 432, 434, etc. Each of these devices can be implemented via computer-executable instructions that can run on one or more computers, and/or in combination with other program modules and/or as a combination of hardware and software. For example, computing environment 500 can facilitate in whole or in part accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 6:
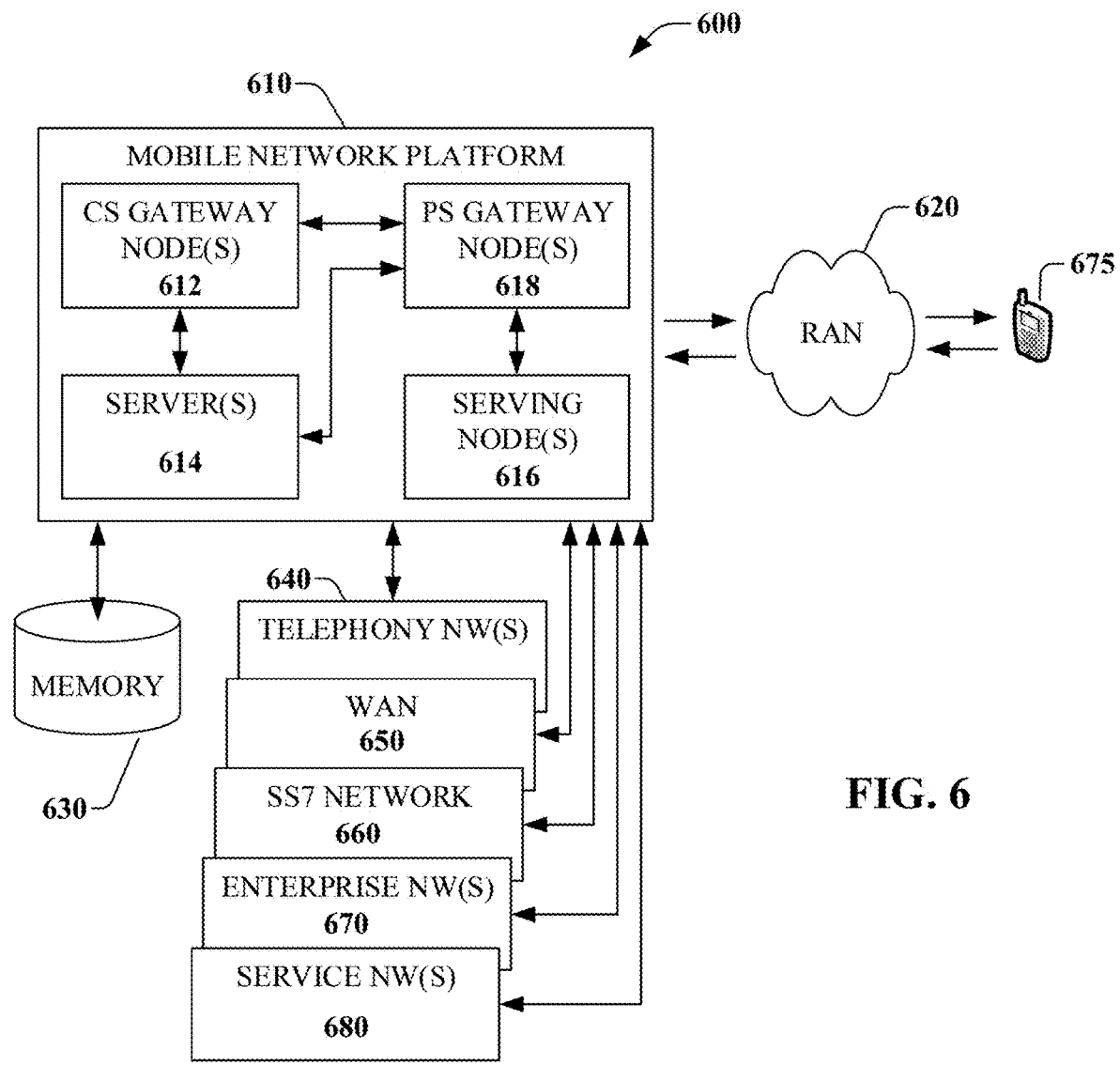
FIG. 6 is a block diagram of an example, non-limiting embodiment of a mobile network platform in accordance with various aspects described herein.

Turning now to FIG. 6, an embodiment 600 of a mobile network platform 610 is shown that is an example of network elements 150, 152, 154, 156, and/or VNEs 430, 432, 434, etc. For example, platform 610 can facilitate in whole or in part accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing. In one or more embodiments, the mobile network platform 610 can generate and receive signals transmitted and received by base stations or access points such as base station or access point 122. Generally, mobile network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 610 can be included in telecommunications carrier networks, and can be considered carrier-side components as discussed elsewhere herein. Mobile network platform 610 comprises CS gateway node(s) 612 which can interface CS traffic received from legacy networks like telephony network(s) 640 (e.g., public switched telephone network (PSTN), or public land mobile network (PLMN)) or a signaling system #7 (SS7) network 660. CS gateway node(s) 612 can authorize and authenticate traffic (e.g., voice) arising from such networks. Additionally, CS gateway node(s) 612 can access mobility, or roaming, data generated through SS7 network 660; for instance, mobility data stored in a visited location register (VLR), which can reside in memory 630. Moreover, CS gateway node(s) 612 interfaces CS-based traffic and signaling and PS gateway node(s) 618. As an example, in a 3GPP UMTS network, CS gateway node(s) 612 can be realized at least in part in gateway GPRS support node(s) (GGSN). It should be appreciated that functionality and specific operation of CS gateway node(s) 612, PS gateway node(s) 618, and serving node(s) 616, is provided and dictated by radio technology(ies) utilized by mobile network platform 610 for telecommunication over a radio access network 620 with other devices, such as a radiotelephone 675.

In addition to receiving and processing CS-switched traffic and signaling, PS gateway node(s) 618 can authorize and authenticate PS-based data sessions with served mobile devices. Data sessions can comprise traffic, or content(s), exchanged with networks external to the mobile network platform 610, like wide area network(s) (WANs) 650, enterprise network(s) 670, and service network(s) 680, which can be embodied in local area network(s) (LANs), can also be interfaced with mobile network platform 610 through PS gateway node(s) 618. It is to be noted that WANs 650 and enterprise network(s) 670 can embody, at least in part, a service network(s) like IP multimedia subsystem (IMS). Based on radio technology layer(s) available in technology resource(s) or radio access network 620, PS gateway node(s) 618 can generate packet data protocol contexts when a data session is established; other data structures that facilitate routing of packetized data also can be generated. To that end, in an aspect, PS gateway node(s) 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, mobile network platform 610 also comprises serving node(s) 616 that, based upon available radio technology layer(s) within technology resource(s) in the radio access network 620, convey the various packetized flows of data streams received through PS gateway node(s) 618. It is to be noted that for technology resource(s) that rely primarily on CS communication, server node(s) can deliver traffic without reliance on PS gateway node(s) 618; for example, server node(s) can embody at least in part a mobile switching center. As an example, in a 3GPP UMTS network, serving node(s) 616 can be embodied in serving GPRS support node(s) (SGSN).

For radio technologies that exploit packetized communication, server(s) 614 in mobile network platform 610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 610. Data streams (e.g., content(s) that are part of a voice call or data session) can be conveyed to PS gateway node(s) 618 for authorization/authentication and initiation of a data session, and to serving node(s) 616 for communication thereafter. In addition to application server, server(s) 614 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 610 to ensure network's operation and data integrity in addition to authorization and authentication procedures that CS gateway node(s) 612 and PS gateway node(s) 618 can enact. Moreover, provisioning server(s) can provision services from external network(s) like networks operated by a disparate service provider; for instance, WAN 650 or Global Positioning System (GPS) network(s) (not shown). Provisioning server(s) can also provision coverage through networks associated to mobile network platform 610 (e.g., deployed and operated by the same service provider), such as the distributed antennas networks shown in FIG. 1(*s*) that enhance wireless service coverage by providing more network coverage.

It is to be noted that server(s) 614 can comprise one or more processors configured to confer at least in part the functionality of mobile network platform 610. To that end, the one or more processor can execute code instructions stored in memory 630, for example. It is should be appreciated that server(s) 614 can comprise a content manager, which operates in substantially the same manner as described hereinbefore.

In example embodiment 600, memory 630 can store information related to operation of mobile network platform 610. Other operational information can comprise provisioning information of mobile devices served through mobile network platform 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network(s) 640, WAN 650, SS7 network 660, or enterprise network(s) 670. In an aspect, memory 630 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
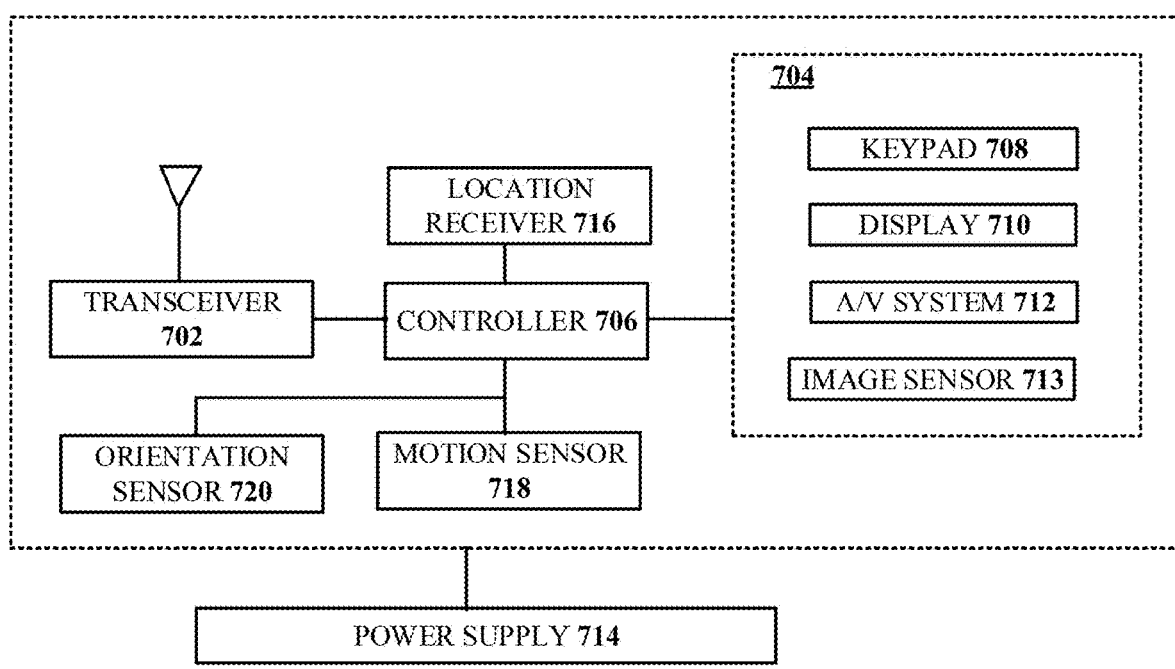
FIG. 7 is a block diagram of an example, non-limiting embodiment of a communication device in accordance with various aspects described herein.

Turning now to FIG. 7, an illustrative embodiment of a communication device 700 is shown. The communication device 700 can serve as an illustrative embodiment of devices such as data terminals 114, mobile devices 124, vehicle 126, display devices 144 or other client devices for communication via either communications network 125. For example, computing device 700 can facilitate in whole or in part accessing adaptive streaming information for a multimedia content segment, determining available access bandwidths for a plurality of video tracks and a plurality of audio tracks identified by the adaptive streaming information, selecting one of a plurality of candidate track pairings identified by the adaptive streaming information based on the available access bandwidths, obtaining video content of the multimedia content segment via a video track of the selected track pairing, and obtaining audio content of the multimedia content segment via an audio track of the selected track pairing.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system for an adaptive streaming client, the processing system including a processor; and
   a memory that stores executable instructions that, when executed by the processing system, facilitate performance of operations, the operations comprising:
   accessing adaptive streaming information for a multimedia content segment, wherein the adaptive streaming information identifies:
      a plurality of video tracks conveying video content of the multimedia content segment; and
      a plurality of audio tracks conveying audio content of the multimedia content segment;
   receiving an auxiliary file including a plurality of allowable track pairings;
   accessing the plurality of track pairings from the auxiliary file, wherein each of the plurality of track pairings comprises a respective video track among the plurality of video tracks and a respective audio track among the plurality of audio tracks;
   performing a joint audio/video adaptation assessment of the plurality of track pairings to select one of the plurality of track pairings, resulting in a selected track pairing, wherein the joint audio/video adaptation assessment comprises assessing the plurality of track pairings based on:
      increasing a quality level of the selected track pairing, while reducing variations in the quality level of the selected track pairing;
   a genre characteristic of the multimedia content segment;
      first bandwidth requirements for the plurality of video tracks;
      available access bandwidths for a first network path associated with the plurality of video tracks;
      second bandwidth requirements for the plurality of audio tracks; and
      available access bandwidths for a second network path associated with the plurality of audio tracks;
   synchronizing a first duration of the video content of the multimedia content segment with a second duration of the audio content of the multimedia content segment;
   obtaining the video content of the multimedia content segment via a video track of the selected track pairing, wherein the video track is accessed via the first network path associated with the plurality of video tracks; and
   obtaining the audio content of the multimedia content segment via an audio track of the selected track pairing, wherein the audio track is accessed via the second network path associated with the plurality of audio tracks, wherein the first network path and the second network path are not the same, and wherein the synchronizing of the first duration of the video content of the multimedia content segment and the second duration of the audio content of the multimedia content segment prevents an underflow of an audio content buffer, a video content buffer, or any combination thereof.

2. The device of claim 1, wherein the joint audio/video adaptation assessment comprises assessing the plurality of track pairings based further on maximizing the quality level of the selected track pairing, while minimizing the variations I the quality level of the selected track pairing.

3. The device of claim 1, wherein the operations further comprise:
   requesting a manifest file from an adaptive streaming server; and
   receiving the manifest file responsive to the requesting the manifest file, wherein the manifest file comprises the adaptive streaming information for the multimedia content segment.

4. The device of claim 1, wherein the genre characteristic includes an action video or a music video.

5. The device of claim 4, wherein the adaptive bitrate streaming protocol comprises a Dynamic Adaptive Streaming over Hypertext Transfer Protocol (DASH) protocol or a Hypertext Transfer Protocol Live Streaming (HLS) protocol.

6. The device of claim 1, wherein the adaptive streaming information indicates the first bandwidth requirements for the plurality of video tracks and the second bandwidth requirements for the plurality of audio tracks.

7. The device of claim 6, wherein the adaptive streaming information indicates joint bandwidth requirements for the plurality of track pairings.

8. The device of claim 1, wherein the operations further comprise obtaining bandwidth requirement information for the multimedia content segment via an auxiliary file download, wherein the bandwidth requirement information indicates the first bandwidth requirements for the plurality of video tracks and the second bandwidth requirements for the plurality of audio tracks.

9. A non-transitory machine-readable medium, comprising executable instructions that, when executed by a processing system for an adaptive streaming client, the processing system including a processor, facilitate performance of operations, the operations comprising:
requesting a manifest file from an adaptive streaming server;
receiving the manifest file responsive to the requesting the manifest file, wherein the manifest file comprises adaptive streaming information for a multimedia content segment, wherein the adaptive streaming information identifies:
a plurality of video tracks conveying video content of the multimedia content segment; and
a plurality of audio tracks conveying audio content of the multimedia content segment;
receiving an auxiliary file including a plurality of allowable track pairings;
accessing the plurality of track pairings from the auxiliary file, wherein each of the plurality of track pairings comprises a respective video track among the plurality of video tracks and a respective audio track among the plurality of audio tracks;
performing a joint audio/video adaptation assessment of the plurality of track pairings to select one of the plurality of track pairings, resulting in a selected track pairing, wherein the joint audio/video adaptation assessment comprises assessing the plurality of track pairings based on:
increasing a quality level of the selected track pairing, while reducing variations in the quality level of the selected track pairing;
a genre characteristic of the multimedia content segment;
first bandwidth requirements for the plurality of video tracks;
available access bandwidths for a first network path associated with the plurality of video tracks;
second bandwidth requirements for the plurality of audio tracks; and
available access bandwidths for a second network path associated with the plurality of audio tracks;
synchronizing a first duration of the video content of the multimedia content segment with a second duration of the audio content of the multimedia content segment;
obtaining the video content of the multimedia content segment via a video track of the selected track pairing, wherein the video track is accessed via the first network path associated with the plurality of video tracks; and
obtaining the audio content of the multimedia content segment via an audio track of the selected track pairing, wherein the audio track is accessed via a second network path associated with the plurality of audio tracks, and wherein the first network path and the second network path are not the same, and wherein the synchronizing of the first duration of the video content of the multimedia content segment and the second duration of the audio content of the multimedia content segment prevents an underflow of an audio content buffer, a video content buffer, or any combination thereof.

10. The non-transitory machine-readable medium of claim 9, wherein the joint audio/video adaptation assessment comprises assessing the plurality of track pairings based further on:
an audio buffer level of the adaptive streaming client; and
a video buffer level of the adaptive streaming client.

11. The non-transitory machine-readable medium of claim 9, wherein the manifest file is formatted in accordance with an adaptive bitrate streaming protocol.

12. The non-transitory machine-readable medium of claim 11, wherein the adaptive bitrate streaming protocol comprises a Dynamic Adaptive Streaming over Hypertext Transfer Protocol (DASH) protocol or a Hypertext Transfer Protocol Live Streaming (HLS) protocol.

13. The non-transitory machine-readable medium of claim 9, wherein the adaptive streaming information indicates the first bandwidth requirements for the plurality of video tracks and the second bandwidth requirements for the plurality of audio tracks.

14. The non-transitory machine-readable medium of claim 13, wherein the adaptive streaming information indicates joint bandwidth requirements for the plurality of track pairings.

15. The non-transitory machine-readable medium of claim 9, wherein the operations further comprise obtaining bandwidth requirement information for the multimedia content segment via an auxiliary file download, wherein the bandwidth requirement information indicates the first bandwidth requirements for the plurality of video tracks and the second bandwidth requirements for the plurality of audio tracks.

16. A method, comprising:
requesting, by a processing system for an adaptive streaming client, the processing system including a processor, a manifest file from an adaptive streaming server, wherein the manifest file is formatted in accordance with an adaptive bitrate streaming protocol;
receiving, by the processing system, the manifest file responsive to the requesting the manifest file, wherein the manifest file comprises adaptive streaming information for a multimedia content segment, wherein the adaptive streaming information identifies:
a plurality of video tracks conveying video content of the multimedia content segment; and
a plurality of audio tracks conveying audio content of the multimedia content segment;
receiving, by the processing system, an auxiliary file including a plurality of allowable track pairings;
accessing, by the processing system, the plurality of track pairings from the auxiliary file, wherein each of the plurality of track pairings comprises a respective video track among the plurality of video tracks and a respective audio track among the plurality of audio tracks;
performing, by the processing system, a joint audio/video adaptation assessment of the plurality of track pairings to select one of the plurality of track pairings, resulting in a selected track pairing, wherein the joint audio/video adaptation assessment comprises assessing the plurality of track pairings based on:
  increasing a quality level of the selected track pairing, while reducing variations in the quality level of the selected track pairing;
  a genre characteristic of the multimedia content segment;
  bandwidth requirements for the plurality of video tracks;
  available access bandwidths for a first network path associated with the plurality of video tracks;
  bandwidth requirements for the plurality of audio tracks; and
  available access bandwidths for a second network path associated with the plurality of audio tracks;
synchronizing, by the processing system, a first duration of the video content of the multimedia content segment with a second duration of the audio content of the multimedia content segment;
obtaining, by the processing system, the video content of the multimedia content segment via a video track of the selected track pairing, wherein the video track is accessed via the first network path associated with the plurality of video tracks; and
obtaining, by the processing system, the audio content of the multimedia content segment via an audio track of the selected track pairing, wherein the audio track is accessed via the second network path associated with the plurality of audio tracks, and wherein the first network path and the second network path are not the same, and wherein the synchronizing the first duration of the video content of the multimedia content segment and the second duration of the audio content of the multimedia content segment prevents an underflow of an audio content buffer, a video content buffer, or any combination thereof.

17. The method of claim 16, wherein the joint audio/video adaptation assessment comprises assessing the plurality of track pairings based further on:
  an audio buffer level of the adaptive streaming client; and
  a video buffer level of the adaptive streaming client.

18. The method of claim 16, wherein the adaptive bitrate streaming protocol comprises a Dynamic Adaptive Streaming over Hypertext Transfer Protocol (DASH) protocol or a Hypertext Transfer Protocol Live Streaming (HLS) protocol.

19. The method of claim 16, wherein the adaptive streaming information indicates the first bandwidth requirements for the plurality of video tracks and the second bandwidth requirements for the plurality of audio tracks.

20. The method of claim 16, further comprising obtaining bandwidth requirement information for the multimedia content segment via an auxiliary file download, wherein the bandwidth requirement information indicates the first bandwidth requirements for the plurality of video tracks and the second bandwidth requirements for the plurality of audio tracks.

* * * * *